3,674,555
LOW DENSITY STARCH HYDROLYSATES
Gilbert R. Meyer, Overland Park, Kans., and Rollo J. Everett, Worth, Ill., assignors to CPC International Inc.
No Drawing. Filed June 24, 1970, Ser. No. 49,583
Int. Cl. A23l 1/26; C13l 1/08
U.S. Cl. 127—29                                  8 Claims

---

ABSTRACT OF THE DISCLOSURE

Process for producing spray dried starch hydrolysates having a bulk density below about 20 pounds per cubic foot which comprises: (a) heating an aqueous slurry containing from about 20% to about 45% by weight of a starch hydrolysate having a D.E. of from about 2 to about 30 in a first, confined zone under pressure of a temperature of from about 210° F. to about 300° F.; (b) injecting the slurry into a second, large volume zone into contact with heated air having a temperature of from about 320° F. to about 450° F. with a sudden release of the pressure on the slurry upon injection; (c) maintaining conditions in the second zone such that drying to a moisture content below about 3% is achieved before the resultant dry solids engage against a collection surface; and (d) recovering the dried solids in particulate form.

---

This invention relates to spray dried starch hydrolysates and the processes for making them. More particularly, the present invention relates to methods for preparing low density starch hydrolysates useful in the food industry.

The use of starch hydrolysates in industrial and food products has increased substantially in recent years. The varied uses are demanding many different types of products. For instance, it may be highly desirable in some food products to use starch hydrolysates of high bulk density. In other cases, low bulk density is desirable as well as rapid dispersibility in water. The desire for low calorie diets has spurred the need for development of low D.E., low bulk density products to be used as fillers, extenders, and sugar substitutes in many food products.

It has now been found that dry solid starch hydrolysates starch hydrolysates having high and rapid dispersibility in water and a low bulk density.

It is another object of the present invention to provide syrup solids in dry particulate form wherein the particles are substantially hollow spheres.

Other objects and advantages of the present invention will be apparent hereinafter from the specification and from the appended claims.

It has now ben found that dry solid starch hydrolysates can be prepared which have exceedingly low bulk densities by spray drying aqueous slurries of starch hydrolysates at certain concentrations under conditions hereinafter described.

More specifically, the present invention provides a continuous process for producing spray dried starch hydrolysates having a bulk density below about 20 pounds per cubic foot which comprises:

(a) heating an aqueous slurry containing from about 20% to about 45% by weight of a starch hydrolystate having a D.E. of from about 2 to about 30 in a first, confined zone under pressure to a temperature of from about 210° F. to about 300° F.;
(b) injecting the slurry into a second, large volume zone into contact with heated air having a temperature of from about 320° F. to about 450° F. with a sudden release of the pressure on the slurry upon injection;
(c) maintaining conditions in the second zone such that drying to a moisture content below about 3% is achieved before th resultant dry solids engage against a collection surface; and
(d) recovering the dried solids in particulate form.

A preferred embodimnet of the present invention resides in a continuous process for producing spray dried starch hydrolysates having a bulk density below about 15 pounds per cubic foot which comprises:

(a) heating an aqueous slurry containing from about 20% to about 45% by weight of a starch hydrolysate having a D.E. of from about 5 to about 25 in a first, confined zone under pressure to a temperature of from about 212° F. to about 250° F.;
(b) injecting the slurry into a second, large volume zone into contact with heated air having a temperature of from about 350° F. to about 400° F. with a sudden release of pressure on the slurry upon injection;
(c) maintaining conditions in the second zone such that drying to a moisture content between about 0.5% and about 3.0% is achieved before the resultant dry solids engage against a collection surface; and
(d) recovering the dried solids in particulate form.

The present invention may be applied to any starch hydrolysate having a dextrose equivalent (D.E.) of from about 2 to about 30 from which it is desirous to obtain a low density solid product. Particularly suitable are starch hydrolysates having a D.E. of from about 5 to about 25. These starch hydrolysates are typically obtained by the enzyme conversion or the combination of acid treatment and enzyme conversion of starch obtained from a variety of sources such as from corn, potatoes, tapioca, sorghum, waxy milo, waxy maize, rice and the like. Clear starch hydrolysate syrups having a D.E. below 25 are products that have recently become available on a commercial scale.

To obtain the low density products of the present invention, the starch hydrolysates must be spray dried from an aqueous slurry or solution at a concentration of from about 20% solids to about 45% solids by weight. This aqueous slurry or solution is heated under superatmospheric pressures to a temperature of from about 210° F. to about 300° F. and preferably to a temperature of from about 212° F. to about 250° F. prior to spray drying. The resulting superheated slurry under superatmospheric pressure is then injected into a drying zone with a sudden release of pressure to atmospheric conditions. The drying zone can comprise a heated air column of sufficient size that the drying particles do not come in contact with a collection surface until they have dried to a moisture content of less than about 3%.

The injection of the superheated slurry, which is referred to as a syrup in the examples that follow, is done with the use of a nozzle to yield a particulate product. Injection through means of a centrifugal atomizer provides a product similar to cotton candy, wherein the syrup remains in substantially continuous form, resulting in a stringy type product. Under microscopic examination, it will be noted that the products produced in accordance with the present invention are hollow spheres which, upon attrition, may break to provide partial spherical products. These products have a bulk density of less than about 20 pounds per cubic foot and preferably less than about 15 pounds per cubic foot. The bulk density as used herein is loose bulk density, that is, the density of the material determined in the state as poured and without packing.

The invention will now be described in further detail by means of several exemplary demonstrations thereof. Unless otherwise specified, all temperatures are in degrees Fahrenheit, all percentages by weight, and al pressures p.s.i.g.

EXAMPLE I

This example illustrates the feasibility of obtaining a low bulk density from a syrup of 35% to 40% dry substance and having a D.E. of about 12.

A corn starch hydrolysate having a D.E. about 12 and a dry substance content of 37.2% was heated to a temperature of 232° F. in a tubular heat exchanger that was directly connected to the nozzle of a spray drying atomizer. The pressure at the time that the syrup reached a temperature of 220° was about 3300 p.s.i.g. The temperature of the surrounding drying zone was maintained at about 390° F. The resulting product consisted primarily of fragments of hollow spheres, and had a bulk density of about 11.7 pound per cubic foot.

The same syrup product, when processed through the same atomizing equipment at an injection temperature of 140° F. yielded a product of 23 pounds per cubic foot bulk density.

The product solids were instantly soluble in cold water. They had a bland flavor and a clean, white appearance. They are particularly useful as a carrier material for synthetic sweeteners, to form a low calorie substitute for sucrose that can be used in place of sucrose on an approximately equal volume of replacement basis.

Other syrups of differing dry substance concentrations were processed at different temperatures. The results of these additional demonstrations of the invention ar summarized in Table 1 below.

TABLE 1

| Ex. | Dry substance concentration, percent | Syrup temperature, °F. | Dextrose equivalent | Pressure, p.s.i.g. | Air temperature for spray drier °F. Inlet | Air temperature for spray drier °F. Outlet | Product bulk density, lbs./cu. ft. |
| --- | --- | --- | --- | --- | --- | --- | --- |
| 2 | 35.3 | 233 | 22 | 5,000 | 390 | 280 | 10.6 |
| 3 | 37.2 | 242 | 12 | 2,500 | 390 | 308 | 12.3 |
| 4 | 37.0 | 140 | 20 | 4,000 | 333 | 255 | 23.3 |
| 5 | 49.0 | 140 | 12 | 4,000 | 312 | 250 | 28.3 |
| 6 | 74.0 | 223 | 22 | 5,000 | 365 | 330 | 23.3 |

It can be seen from the result set forth in Table 1 that when process conditions outside those required for the present invention, a product of exceedingly low bulk density is not obtained. Thus, Examples 4, 5, 6, which deviate from the present invention in dry substance concentration, syrup temperature or both, result in a product having a bulk density of 23.3, 28.2 and 23.3 respectively.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

The invention is hereby claimed as follows.

We claim:

1. A process for producing spray dried starch hydrolysates having a bulk density below about 20 pounds per cubic foot which comprises:
    (a) heating an aqueous slurry containing from about 20% to about 45% by weight of a starch hydrolysate having a D.E. of from about 2 to about 30 in a first, confined zone under pressure to a temperature of from about 210° F. to about 300° F.;
    (b) injecting the slurry into a second, large volume zone into contact with heated air having a temperature of from about 320° F. to about 450° F. with a sudden release of the pressure on the slurry upon injection;
    (c) maintaining conditions in the second zone such that drying to a moisture content below about 3% is achieved before the resultant dry solids engage against a collection surface; and
    (d) recovering the dried solids in particulate form.

2. A process as in claim 1 wherein the temperature in the first, confined zone is between about 212° F. and about 250° F.

3. A process as in claim 1 wherein the air in the second, large volume zone is heated to a temperature between about 350° F. and about 400° F.

4. A process as in claim 1 wherein the moisture content in part (c) of claim 1 is between about 0.5% and about 3.0%.

5. A process as in claim 1 wherein the starch hydrolysate is a corn starch hydrolysate.

6. A process as in claim 1 wherein the starch hydrolysate has a D.E. of from about 5 to about 25.

7. The continuous process for producing spray dried starch hydrolysates of claim 1, having a bulk density below about 15 pounds per cubic foot which comprises:
    (a) heating an aqueous slurry containing from about 20% to about 45% by weight of a starch hydrolysate having a D.E. of from about 5 to about 25 in a first, confined zone under pressure to a temperature of from about 212° F. to about 250° F.;
    (b) injecting the slurry into a second, large volume zone into contact with heated air having a temperature of from about 350° F. to about 400° F. with a sudden release of pressure on the slurry upon injection;
    (c) maintaining conditions in the second zone such that drying to a moisture content between about 0.5% and about 3.0% is achieved before the resultant dry solids engage against a collection surface; and
    (d) recovering the dried solids in particulate form.

8. Starch hydrolysate solids having a bulk density below about 20 pounds per cubic foot produced in accordance with the process of claim 1.

References Cited

UNITED STATES PATENTS

| | | | |
| --- | --- | --- | --- |
| 2,317,479 | 4/1943 | Peebles | 127—30 |
| 2,429,964 | 10/1947 | Schopmeyer | 127—29 X |
| 2,433,818 | 12/1947 | Schopmeyer | 127—29 X |
| 2,149,517 | 3/1939 | Fleming | 127—30 |
| 2,192,951 | 3/1940 | Wolff | 127—29 |

MORRIS O. WOLK, Primary Examiner

S. MARANTZ, Assistant Examiner

U.S. Cl. X.R.

99—141 R, 199; 127—38